United States Patent Office 3,701,777
Patented Oct. 31, 1972

3,701,777
SUBSTITUTED [3-(4-PHENYL-1-PIPERAZINYL)
PROPOXY OR PROPYL THIO] ANILINES
Albrecht Edenhofer, Riehen, and Hans Spiegelberg, Basel, Switzerland, assignors to Hoffmann-La Roche Inc., Nutley, N.J.
No Drawing. Filed Dec. 4, 1969, Ser. No. 882,297
Claims priority, application Switzerland, Dec. 24, 1968, 19,269/68
Int. Cl. C07d 51/70
U.S. Cl. 260—268 PH
16 Claims

ABSTRACT OF THE DISCLOSURE

Substituted [3-(4-phenyl-1-piperazinyl)-propoxy or propyl-thio]anilines prepared, inter alia, by the reaction of the correspondingly substituted propoxy or propyl-thio anilines and N-phenyl-piperazines, are described. The end products, i.e., the substituted [3-(4-phenyl-1-piperazinyl)-propoxy or propyl-thio]anilines are useful as hypotensive agents.

BRIEF SUMMARY OF THE INVENTION

The invention relates to aromatic ethers of the formula

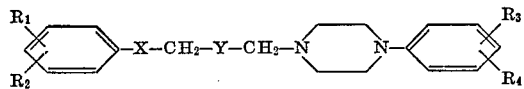

wherein $R_1$ is amino, mono-(lower alkyl)amino, lower alkanoyl-amido, N-(lower alkyl) lower alkanoylamido, lower lower, lower alkylsulfonylamido;
$R_2$ is hydrogen or halogen;
$R_3$ and $R_4$, individually, are hydrogen, hydroxy, amino, halogen, lower alkyl or lower alkoxy;
X is oxy or thio; and
Y is methylene, hydroxymethylene, lower alkanoyloxy-methylene, lower alkyl-sulfonyloxymethylene, arylsulfonyloxymethylene or carbonyl, and their pharmaceutically acceptable acid addition salts.

In another aspect, the invention relates to novel intermediates, for example, the compounds of formulas

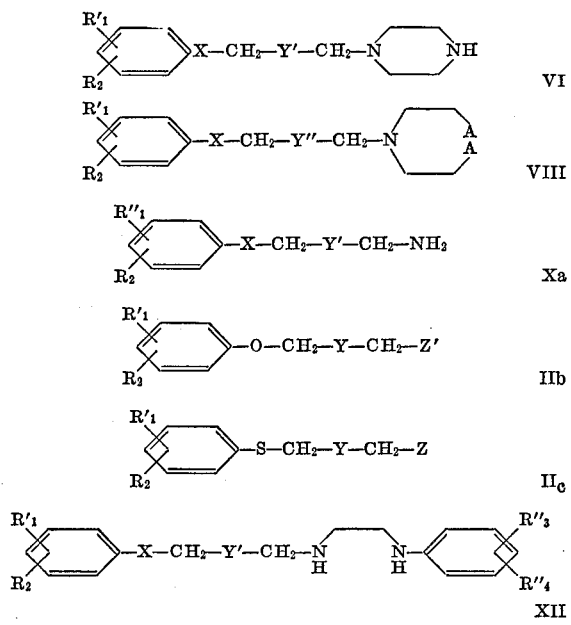

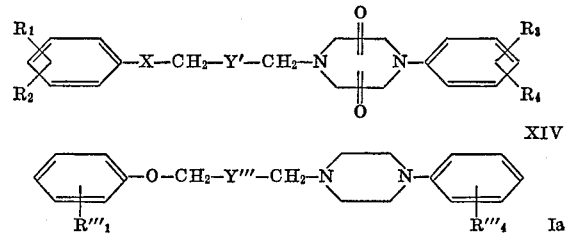

wherein the various substituents are as hereinafter described, except that Z' is halogen, lower alkyl-sulfonyloxy or arylsulfonyloxy, $R''_1$ is lower alkanoyl-amido or N-(lower alkyl)lower alkanoylamido, $R'''_1$ and $R'''_4$ are nitro, or $R'''_1$ is nitro and $R'''_4$ is lower alkoxy, or $R'''_4$ is nitro and $R'''_1$ is lower alkanoylamido and Y''' is methylene or hydroxymethylene.

DETAILED DESCRIPTION OF THE INVENTION

The invention relates to aromatic ethers of the formula

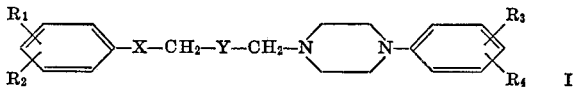

wherein $R_1$ is amino, mono-(lower alkyl)amino, lower alkanoyl-amido, N-(lower alkyl)lower alkanoylamido, lower alkylsulfonylamido;
$R_2$ is hydrogen or halogen;
$R_3$ and $R_4$, individually, are hydrogen, hydroxy, amino, halogen, lower alkyl or lower alkoxy;
X is oxy or thio; and
Y is methylene, hydroxymethylene, lower alkanoyloxy-methylene, lower alkylsulfonyloxymethylene, arylsulfonyloxymethylene or carbonyl and their pharmaceutically acceptable acid addition salts.

As used herein, the term "lower alkyl" denotes straight or branched chain lower alkyl of 1 to 6 carbon atoms, for example, methyl, ethyl or isopropyl, butyl, pentyl and the like. The term "lower alkoxy" denotes lower alkyl ether groups in which the lower alkyl is as described above, for example, methoxy, ethoxy, isopropoxy and the like. The term "halogen" denotes chlorine, bromine, fluorine and iodine. Of the halogens, fluorine and chlorine are preferred.

The amino group, if desired, can be substituted by lower alkyl of 1 to 6 carbon atoms, such as for example, methyl- ethyl-, propyl-, butyl- or pentyl-amino and the like. The term "lower alkanoyl" denotes a residue of 1 to 6 carbon atoms which is derived from a residue of a carboxylic acid of 1 to 6 carbon atoms, for example, formyl, acetyl, propionyl or the like; acetyl is preferred. The lower alkylsulfonyl residues are derived from sulfuric acid substituted by lower alkyl, for example, methylsulfonyl, ethylsulfonyl and the like; methylsulfonyl is preferred. The term "aryl" denotes phenyl or phenyl bearing a lower alkyl of 1-4 carbon atoms. Of these, p-tolyl is preferred.

Representative examples of the compounds of Formula I of the invention are:

rac.-o-{3-[4-(o-methoxy-phenyl)-1-piperazinyl]-2-hydroxy-propoxy}-aniline;
rac.-o-{3-[4-(o-methoxy-phenyl)-1-piperazinyl]-2-hydroxy-propoxy}-methylaniline;
rac.-o-{3-[4-(o-amino-phenyl)-1-piperazinyl]-2-hydroxy-propoxy}-aniline;
rac.-2'-[3-(4-phenyl-1-piperazinyl)-2-hydroxy-propoxy]-acetanilide;
rac.-2'-[3-(4-phenyl-1-piperazinyl)-2-hydroxy-propoxy]-propionanilide;

rac.-2'-{3-[4-(p-chloro-phenyl)-1-piperazinyl]-2-hydroxy-propoxy}-acetanilide;
rac.-2'-[3-(4-o-tolyl-1-piperazinyl)-2-hydroxy-propoxy]-acetanilide;
rac.-2'-{3-[4-(o-methoxy-phenyl)-1-piperazinyl]-2-hydroxy-propoxy}-acetanilide;
rac.-2'-{3-[4-(2,4-dimethoxy-phenyl)-1-piperazinyl]-2-hydroxy-propoxy}-acetanilide;
rac.-2'-{3-[4-(o-ethoxy-phenyl)-1-piperazinyl]-2-hydroxy-propoxy}-propionanilide;
rac.-2'-{3-[4-(o-acetamido-phenyl)-1-piperazinyl]-2-hydroxy-propoxy}-acetanilide;
rac.-2'-{3-[4-(o-methoxy-phenyl)-1-piperazinyl]-2-hydroxy-propoxy}-N-methyl-acetanilide;
rac.-2'-{3-[4-(o-methoxy-phenyl)-1-piperazinyl]-2-hydroxy-propoxy}-methane-sulfonanilide;
rac.2'-{3-[4-(o-methoxy-phenyl)-1-piperazinyl]-2-acetoxy-propoxy}-acetanilide;
2'-{3-[4-(o-methoxy-phenyl)-1-piperazinyl]-propoxy}-acetanilide;
4'-[{3-[4-(o-methoxy-phenyl)-1-piperazinyl]-propyl}-thio]-acetanilide;
rac.-4'-[{3-[4-(o-methoxy-phenyl)-1-piperazinyl]-2-hydroxy-propyl}-thio]-acetanilide;
(+) o-{3-[4-(o-methoxy-phenyl)-1-piperazinyl]2-hydroxy-propoxy}-aniline;
(+) 2'-{3-[4-(o-methoxy-phenyl)-1-piperazinyl]-2-hydroxy-propoxy}-acetanilide; and the like.

Compounds of the invention can be prepared according to the following process variants:

(a) A compound of the formula

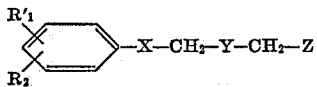
II wherein $R'_1$ is nitro, lower alkanoylamino, N-(lower alkyl) lower alkanoylamido;
$R_2$ is hydrogen or halogen;
X is oxy or thio;
Y is methylene, hydroxymethylene, lower alkanoyloxymethylene, lower alkyl-sulfonyloxymethylene, arylsulfonyloxymethylene or carbonyl;
Z is halogen, aryl or lower alkyl sulfonyloxy or when taken together with Y and the end methylene group is

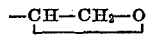

is reacted with a compound of the formula

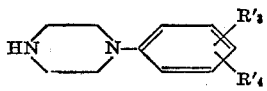
III wherein $R'_3$ and $R'_4$, individually, are hydrogen, hydroxy, nitro, halogen, lower alkyl or lower alkoxy;

(b) A compound of the formula

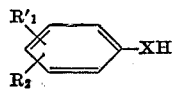
IV wherein $R'_1$, $R_2$ and X are as previously described,
is reacted with a compound of the formula

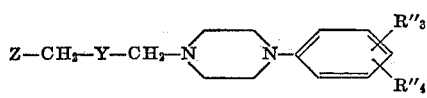
V wherein
Y and Z are as previously described; and
$R''_3$ and $R''_4$, individaully, are hydrogen, nitro, halogen, lower alkyl or lower alkoxy;

(c) A compound of the formula

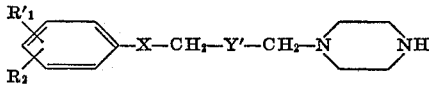
VI wherein
$R'_1$, $R_2$ and X are as previously described; and
Y' is methylene, hydroxymethylene or carbonyl,
is reacted with a compound of the formula

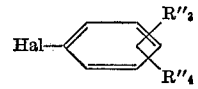
VII wherein
$R''_3$ and $R''_4$ are as previously described; and
Hal is halogen;

(d) A compound of the formula

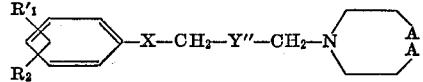
VIII wherein
$R'_1$, $R_2$ and X are as previously described;
Y''' is methylene or carbonyl and A is halogen, lower alkylsulfonyloxy or arylsulfonyloxy,
is reacted with a compound of the formula

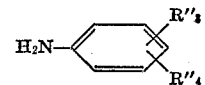
IX wherein $R''_3$ and $R''_4$ are as previously described;

(e) A compound of the formula

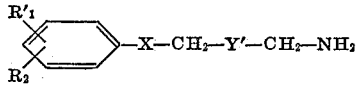
X wherein $R'_1$, $R_2$, X and Y' are as previously described,
is reacted with a compound of the formula

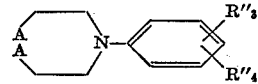
XI wherein $R''_3$, $R''_4$ and A are as previously described;

(f) A compound of the formula

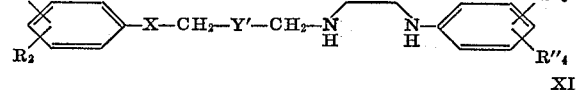
XII wherein $R'_1$, $R_2$, $R''_3$, $R''_4$, X and Y' are as previously described,
is reacted with a compound of the formula $$A-CH_2-CH_2-A \qquad XIII$$

wherein A is as previously described; or (g) The amide groups in a compound of the formula

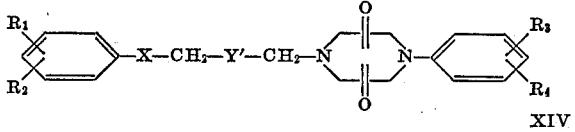
XIV wherein $R_1$, $R_2$, $R_3$, $R_4$, X and Y' are as previously described,
are deoxygenated. The product obtained in a given case above can be further modified. For example, a nitro group is reduced, an acylamido group is saponified, if desired, an amino group or a monoalkylamino group is acylated or an amino group is alkylated, if desired, a carbonyl is reduced to the hydroxymethylene, if desired, a hydroxymethylene is esterified, if desired, and the compound of Formula I obtained is optionally converted into a pharmaceutically acceptable acid addition salt.

Of the starting compounds of Formula II, 2'-[2,3-epoxy-propxy]-acetanilide is a known compound. On the other hand, the corresponding 2'-[2-hydroxy-3-halo(or tosyloxy)-propoxy]-acetanilide is a new compound which can, for example, be prepared by treating the epoxide mentioned hereinbefore in a protic solvent, for example, a lower alkanol such as methanol with an acid addition salt of a tertiary base, for example, pyridine hydrochloride or triethylamine hydrochloride and, preferably at a temperature in the range of between about room temperature and the boiling point of the reaction mixture. The other compounds of Formula II can be prepared in an analogous manner.

The compounds of Formula III, for example 1-[o-methoxy-phenyl]-piperazine, are known compounds or can be prepared in accordance with known procedures.

The reaction of the compounds of Formula II with those of Formula III when the compound of Formula II is the corresponding epoxide, is advantageously carried out in a polar organic solvent, for example, a lower alkanol such as methanol, or a cyclic ether such as dioxane at a temperature in the range of between about room temperature and the boiling temperature of the reaction mixture. The corresponding halo or tosyloxy compound of Formula II is reacted in the presence of an acid-binding agent, for example, potassium or sodium carbonate, in a lower alkanol such as ethanol or isopropanol, or in dimethylformamide or tetrahydrofuran, at a temperature in the range of between about room temperature and the boiling temperature of the reaction mixture.

The starting compounds of Formula IV, for example, o-acetamido-phenol, are known compounds or can be prepared in accordance with known procedures.

On the other hand, the reaction components of Formula V are known compounds.

The corresponding tosyloxy compound can be prepared by reaction of the epoxide obtained with p-toluenesulfonic acid.

The reaction of compounds of Formula IV with the halo or tosyloxy compounds of Formula V is advantageously carried out by converting the compound of Formula IV into the alkali salt with an alkali metal alkanolate and allowed to react with the compound of Formula V at a temperature in the range of between about room temperature and the boiling temperature of the reaction mixture.

If the epoxide of a compound of Formula V is utilized, the reaction with a compound of Formula IV is preferably carried out in the presence of a catalytic amount of an organic or inorganic base, such as pyridine or potassium hydroxide, in a polar solvent, preferably a lower alkanol such as ethanol, or a cyclic ether such as dioxane, conveniently at a temperture in the range of between about room temperature and the boiling temperature of the reaction mixture.

The compounds of Formula VI are new compounds. 4'-[3-(1-piperazinyl)-2-hydroxy-propoxy]-acetanilide, for example, can be prepared by reacting 4'-[2,3-epoxy-propoxy]-acetanilide with 1-benzyl-piperazine in an organic solvent, for example, an alkanol such as ethanol, or a cyclic ether such as dioxane, at an elevated temperature, preferably at the boiling temperature of the reaction mixture and the benzoyl residue is hydrogenolytically split off. The other compounds of Formula VI can be prepared in an analogous manner.

The compounds of Formula VII are known compounds or can be prepared in accordance with known procedures.

The reaction of the comopunds of Formula VI with the compounds of Formula VII is carried out utilizing a polar organic solvent, preferably at a temperature in the range of between about 100 and 200° C.

The compounds of Formula VIII are new compounds. 4'-{3-[bis - (2 - bromo[or bis-2-tosyloxy]-ethyl)-amino]-propoxy}-acetanilide, for example, can be prepared by reacting 4'-[3-bromo-propoxy]-acetanilide with diethanolamine in the presence of an acid-binding agent, for example, potassium or sodium carbonate, and a polar solvent, preferably a lower alkanol such as ethanol or isopropanol, at an elevated temperature, conveniently at the boiling temperature of the reaction mixture. The resulting di-ethanolmine compound can be halogenated utilizing a halogenating agent, for example, phosphorus tribromide, phosphorus pentachloride or thionyl chloride, or tosylated by treatment with p-toluenesulfonyl chloride in the presence of a base such as pyridine. The other compounds of Formula VIII can be prepared in an analogous manner.

The compounds of Formula IX are known compounds or can be prepared in accordance with known procedures.

The reaction of compounds of Formula VIII with compounds of Formula IX is preferably carried out in the presence of an acid-binding agent, preferably sodium or potassium carbonate, and a polar solvent such as ethanol, isopropanol or n-butanol, at an elevated temperature, conveniently at the boiling temperature of the reaction mixture.

The compounds of Formula X, except the nitro derivatives, are new compounds. 2'-[3-amino-2-hydroxy-propoxy]-acetanilide, for example, can be prepared by reacting a solution of ammonia in a lower alkanol, for example ammonia in methanol, with 2'-[2,3-epoxy-propoxy]-acetanilide at a temperature in the range of between about 0° and room temperature. The mixture of primary and secondary amine obtained is separated by fractional crystallization or by chromatography. The other compounds of Formula X can be prepared in an analogous manner.

The reactants of Formula XI are known compounds or can be prepared in accordance with known procedures.

The reaction of compounds of Formula X with compounds of Formula XI is preferbaly carried out in the presence of an acid-binding agent, for example, sodium or potassium carbonate, and a polar solvent, such as ethanol, isopropanol or n-butanol, at an elevated temperature, conveniently at the boiling temperature of the reaction mixture.

Starting compounds of Formula XII are new compounds. 2' - {3-[2-(O-methoxy-anilino)-ethylamino]-2-hydroxy-propoxy}-acetanilide, for example, can be prepared by reacting 2'-[2,3-epoxy-propoxy]-acetanilide with an excess of ethylenimine at a temperature in the range of between about 0° and room temperature. The 2'-[3-aziridino-2-hydroxy-propoxy]-acetanilide obtained is reacted with O-anisidine in the presence of an acid, preferably maleic acid, at a temperature in the range of between about 0° and room temperature. The other compounds of Formula XII can be prepared in an analogous manner.

The compounds of Formula XIII are known compounds or can be prepared in accordance with known procedures.

The compounds of Formula XII are preferably cyclized with a 1,2-dihalo[or ditosyloxy]-ethane of Formula XIII at an elevated temperature, conveniently at the boiling temperature of the reaction mixture.

The starting compounds of Formula XIV are new compounds and can be prepared as hereinafter described. 2'-[3-(4-phenyl)-1 - (2,6 - diketopiperazinyl) - 2 - hydroxy-propoxy]-acetanilide, for example, can be prepared by reacting 2'-[2,3-epoxy-propoxy]-acetanilide with 4-phenyl-2,6-diketo-piperazine in the presence of catalytic amounts of a base, for example, pyridine and a polar solvent, preferably a lower alkanol, such as ethanol, or a cyclic ether such as dioxane, at an elevated temperature, conveniently at boiling temperature of the reaction mixture. The other compounds of Formula XIV can be prepared in an analogous manner.

The deoxygenation of the amide groups present in compounds of Formula XIV is conveniently carried out by reducing the compound of Formula XIV with a complex metal hydride, for example, with lithium aluminum hydride in an aprotic solvent, such as ethyl ether or tetrahydrofuran, at an elevated temperature, conveniently at the boiling temperature of the reaction mixture. Under the conditions mentioned, the carbonyl group Y' is transformed into a hydroxymethylene group Y.

Compounds obtained which contain a nitro group are expediently reduced by chemical or catalytic means known to the art, for example, with tin/hydrochloric acid or hydrogen in the presence of a noble metal catalyst. The hydrogenation is preferably carried out under normal pressure and room temperature, in an alkanol, preferably ethanol, weakly acidified, for example, with hydrochloric acid, in the presence of palladium/charcoal as catalyst.

The compounds of Formula I obtained in which $R_1$ is alkanoylamido can be saponified in a known manner with acidic or alkaline agents, for example, with dilute aqueous alkali or aqueous acid. The saponification is advantageously carried out with a 20 percent aqueous hydrochloric acid at an elevated temperature, conveniently at the boiling temperature of the reaction mixture.

The compounds of Formula I obtained in which $R_1$ is amino can be acylated in a known manner, for example, by treatment with an acid halide or acid anhydride. When employing alkanoyl or alkylsulfonyl halides and alkanoyl anhydrides, the acylation is conveniently carried out in the presence of a base, for example, pyridine or triethylamine, in the cold, preferably at a temperature in the range of about 0° to about 5° C. When employing alkanoyl anhydrides, the reaction may also be conducted in the presence of a protic solvent, for example, a lower alkanol such as methanol or ethanol, preferably at room temperature, and in the presence of dilute acetic acid.

The compounds of Formula I obtained in which $R_1$ is amino or acylamido can be alkylated in a known manner, for example, with alkyl halides. The reaction is conveniently effected at an elevated temperature, preferably at the boiling point of the reaction mixture. The compounds of Formula I, in which $R_1$ is amino, can be methylated with the aid of formaldehyde/formic acid. In so doing, the amine is dissolved in 90 percent formic acid and treated with 40 percent formaldehyde. Upon the cessation of the evolution of carbon dioxide, the reaction mixture is further heated on the steam bath before being worked up.

The compounds of Formula I obtained in which Y is carbonyl can be reduced to compounds of Formula I in which Y is hydroxymethylene in a known manner, for example, by treatment with a complex metal hydride, preferably a complex borohydride. The reduction is conveniently carried out with the aid of an alkali metal borohydride, for example sodium borohydride, in a lower alkanol such as ethanol or the like at a temperature in the range of between about room temperature and the boiling point of the reaction mixture.

The compounds of Formula I in which Y is hydroxymethylene can be acylated in a known manner, for example, by reaction with a lower alkanoyl, lower alkylsulfonyl or arylsulfonyl halide or anhydide, preferably in the presence of a base, for example, pyridine or triethylamine, at a temperature in the range of between about room temperature and the boiling point of the reaction mixture. An amino group that may be present will likewise be acylated under these conditions.

The compounds of Formula I wherein Y is hydroxymethylene are obtained as racemates. These, as well as the correspondsing nitro-substituted compounds, can be separated into their optical antipodes in a known manner, for example, with the aid of optically active acids such as tartaric acid.

The compounds of Formula I form addition salts with inorganic or organic acids. Exemplary of these are: salts with hydrohalic acids such as hydrochloric or hydrobromic acid, salts with mineral acids, for example, with sulfuric acid, or also salts with organic acids, for example, with benzoic acid, acetic acid, tartaric acid, citric acid, lactic acid or the like.

The aromatic ethers of Formula I prepared in accordance with the invention are hypotensively active, and are therefore useful as hypotensive agents. Compounds of Formula I wherein $R_1$ is acylamido, $R_2$ and $R_3$ are hydrogen, $R_4$ is hydrogen or lower alkoxy, X is oxy and Y is hydroxymethylene are preferred compounds. (+)-2' - {3 - [4 - (o - methoxy - phenyl) - 1 - piperazinyl]-2 - hydroxy - propoxy} - acetanilide has been found to exhibit a potent hypotensive activity. The toxicity of this compound is very low. In mice and rats, the lethal dose [$LD_{50}$] on oral administration is about 300 mg./kg. The blood pressure-lowering action in mice has been demonstrated at a dosage of 0.3 mg. p.o./kg.

Thus, the aromatic ethers of Formula I can be used as hypotensively active agents for controlling pathological high blood pressure, especially for controlling essential hypertonia. For such uses, up to about 200 mg./day of the compounds of Formula I, as exemplified by (+)-2' - {3 - [4 - (o - methoxy - phenyl) - 1 - piperazinyl]-2 - hydroxy - propoxy} - acetanilide can be administered daily in divided doses.

The compounds of Formula I can be used in the form of pharmaceutical preparations which contain them or their salts in admixture with an organic or inorganic pharmaceutically inert carrier suitable for enteral or parenteral application such as, for example, water, gelatin, gum arabic, lactose, starches, vegetable oils, polyalkyleneglycols, and the like. The pharmaceutical preparations can be in solid form, for example, tablets, dragées, suppositories or capsules, or in liquid form, for example, as solutions, suspensions or emulsions. The preparation may be sterilized and/or contain additives, such as preservatives, stabilizers, wetting or emulsifying agents, or salts for varying the osmotic pressure. The pharmaceutical preparations can also contain additional therapeutically active substances.

EXAMPLE 1

Preparation of rac. 4'-[3-(4-phenyl-1-piperazinyl-2-hydroxypropoxy]-acetanilide 2.07 g. of 4'-(2,3-epoxypropoxy)-acetanilide and 1.7 g. of 1-phenyl-piperazine are heated under reflux conditions in 30 ml. of ethanol for 1 hour. The solvent is removed by evaporation under reduced pressure. The residual crystalline 4'-[3-(4-phenyl-1-piperazinyl) - 2 - hydroxypropoxy]-acetanilide is dissolved in ethanol and made congo-acidic with ethanolic hydrochloric acid. The rac. 4'-[3-(4-phenyl-1-piperazinyl) - 2 - hydroxy - propoxy]-acetanilide hydrochloride which precipitates after addition of absolute ether melts at 253–254° C. after recrystallization from ethanol/ether.

In an analogous manner, there is obtained:

By the reaction of 2'-(2,3-epoxypropoxy)-acetanilide and 1-phenyl-piperazine: rac. 2'-[3-(4-phenyl - 1 - piperazinyl)-2-hydroxy-propoxy] - acetanilide hydrochloride having a melting point of 208–209° C. (from methanol/ether);

By reaction of 4'-(2,3-epoxypropoxy)-acetanilide and 1-(p-chloro-phenyl)-piperazine: rac. 4'-{3-[4-(p-chloro-phenyl)-1-piperazinyl]-2 - hydroxy - propoxy} - acetanilide having a melting point of 193–194° C. (from ethanol);

By the reaction of 2'-(2,3-epoxypropoxy)-acetanilide and 1-(p-chloro-phenyl)-piperazine: rac. 2' - {3 - [4 - (p-chloro-phenyl)-1-piperazinyl]-2 - hydroxy - propoxy} acetanilide dihydrochloride having a melting point of 194–195° C. (from methanol/ethyl acetate);

By the reaction of 2'-(2,3-epoxypropoxy)-acetanilide and 1-(o-methoxy-phenyl)-piperazine: rac. 2'-{3 - [4 - (o-methoxy-phenyl)-1-piperazinyl]-2-hydroxy - propoxy} acetanilide hydrochloride having a melting point of 169–170° C. (from methanol/ethyl acetate);

By the reaction of 2'(2,3-epoxypropoxy)-acetanilide and 1-(o-chloro-phenyl)-piperazine: rac. 2' - {3 - [4 - (o-chloro-phenyl)-1-piperazinyl] - 2 - hydroxy - propoxy} acetanilide hydrochloride having a melting point of 201–202° C. (from ethanol/ether);

By the reaction of 2'-(2,3-epoxy-propoxy)-acetanilide and 1-(p-tolyl)-piperazine: rac. 2'-{3-[4-p-tolyl-1-piperazinyl]-2-hydroxy-propoxy} - acetanilide hydrochloride having a melting point of 204–205° C. (from ethanol/ether);

By the reaction of 2'-(2,3-epoxypropoxy)-acetanilide and 1-(m-methoxy-phenyl)-piperazine: rac. 2'-{3-[4-(m-methoxy-phenyl)-1-piperazinyl] - 2 - hydroxy-propoxy}-acetanilide hydrochloride having a melting point of 97–100° C. (from ethanol/ethyl acetate);

By the reaction of 2' - (2,3-epoxy-propoxy) - acetanilide and 1-(o-tolyl)-piperazine: rac. 2'-[3-(4 - o - tolyl - 1-piperazinyl)-2-hydroxy - propoxy] - acetanilide hydrochloride having a melting point of 216° C. (from ethanol/ethyl acetate);

By the reaction of 5'-chloro-2' - (2,3 - epoxy - propoxy)-acetanilide and 1-phenyl-piperazine: rac. 5'-chloro-2'-[3-(4-phenyl-1-piperazinyl) - 2 - hydroxy - propoxy]-acetanilide hydrochloride having a melting point of 200–201° C. (from alcohol/ethyl acetate).

The 5'-chloro-2'-(2,3-epoxypropoxy) - acetanilide employed above can be prepared as follows:

37.1 g. of 4-chloro-2-acetaminophenol are introduced to a solution containing 9.6 g. of sodium hydroxide in 200 ml. of water. The solution is treated all at once with 92.5 g. of epichlorohydrin and the mixture is intensively stirred at room temperature for 20 hours. After washing with water, the precipitate formed is recrystallized from ethyl acetate/petroleum ether. The residual 5'-chloro-2'-(2,3-epoxypropoxy)-acetanilide melts at 87–88° C. after recrystallization from ethyl acetate/petroleum ether.

By the reaction of 3'-(2,3-epoxypropoxy)-acetanilide and 1-phenyl-piperazine: rac. 3'-[3-(4-phenyl-1-piperazinyl)-2-hydroxy-propoxy] - acetanilide hydrochloride having a melting point of 224–225° C. (from ethanol/ethyl acetate).

The 3' - (2,3 - epoxypropoxy) - acetanilide employed above can be prepared in an analogous manner as described above for 5'-chloro-2'-(2,3-epoxypropoxy)-acetanilide. After recrystallization from ethyl acetate/isopropyl ether, the 3'-(2,3-epoxypropoxy)-acetanilide melts at 70–71° C.

By the reaction of 2'-(2,3 - epoxypropoxy) - priopionanilide and 1-phenyl-piperazine: rac. 2'-[3-(4-phenyl-1-piperazinyl)-2-hydroxy - propoxy] - propionanilide hydrochloride having a melting point of 157–158° C. (from methanol/ethyl acetate).

The 2'-(2,3-epoxypopoxy)-propionanilide employed above can be prepared in an analogous manner as described above for 5'-chloro-2'-(2,3-epoxypropoxy)-acetanilide. After recrystallization from ethyl acetate/petroleum ether, the 2'-(2,3-epoxypropoxy)-propionanilide melts at 74–75° C.

By the reaction of 2'-(2,3-epoxypropoxy)-propionanilide and 1-(o-methoxyphenyl)piperazine: rac. 2'-{3-[3-(o-methoxyphenyl) - 1 - piperazinyl]-2-hydroxypropoxy}-propionanilide hydrochloride having a melting point of 143–147° C. (from methanol/ethyl acetate/ether);

By the reaction of 4'-(2,3-epoxypropoxy)propionanilide and 1-(o-methoxyphenyl)piperazine: rac. 4'-{3-[4-(o-methoxyphenyl) - 1 - piperazinyl]-2-hydroxy-propoxy}-propionanilide hydrochloride having a melting point of 190–197° C. (from methanol/ethyl acetate-ether).

The 4'-(2,3-epoxypropoxy)-propionanilide employed above can be prepared in an analogous manner as described above for 5'-chloro-2'-(2,3-epoxypropoxy)-acetanilide. After recrystallization from ethyl acetate/petroleum ether, the 4'-(2,3-epoxypropoxy)-propionanilide melts at 117–120° C.

By the reaction of 2'-(2,3-epoxypropoxy)-propionanilide and 1-(o-ethoxy-phenyl)-piperazine: rac. 2'-{3-[4-(o-ethoxy - phenyl) - 1-piperazinyl]-2-hydroxy-propoxy}-propionanilide hydrochloride having a melting point of 176–178° C. (from methanol/ethyl acetate/ether);

By the reaction of 2'-(2,3-epoxypropoxy)-acetanilide and 1-(o-ethoxy-phenyl)-piperazine: rac. 2'-{-[4-(o-ethoxyphenyl)-1-piperazinyl]-2-hydroxy-propoxy}-acetanilide hydrochloride having a melting point of 157–160° C. (from methanol/ethyl acetate/ether);

By the reaction of 3'-(2,3-epoxypropoxy)-acetanilide and 1 - (o - methoxyphenyl) - piperazine: rac. 3'-{3-[4-(o-methoxyphenyl) - 1-piperazinyl]-2-hydroxy-propoxy}-acetanilide dihydrochloride having a melting point of 205–207° C. (from methanol/ethyl acetate);

By the reaction of 4'-(2,3-epoxypropoxy)-acetanilide and 1 - (o - methoxyphenyl) - piperazine: rac. 4'-{3-[4-(o-methoxyphenyl) - 1-piperazinyl]-2-hydroxy-propoxy}-acetanilide hydrochloride having a melting point of 233° C. (from methanol);

By the reaction of 2'-(2,3-epoxypropoxy)-acetanilide and 1-(o-hydroxyphenyl)-piperazine: hygroscopic rac. 2'-{3 - [4 - (o-hydroxyphenyl)-1-piperazinyl]-2-hydroxypropoxy}-acetanilide hydrochloride (from ethyl acetate);

By the reaction of 2'-(2,3-epoxypropoxy)-acetanilide and 1-(2,4-dimethoxyphenyl)-piperazine: rac. 2'-{3-[4-(2,4-dimethoxyphenyl)-1-piperazinyl]-2-hydroxy-propoxy}-acetanilide dihydrochloride having a melting point of 223–225° C. (from methanol);

By the reaction of 3'-(2,3-epoxypropoxy)-propionanilide and 1-(o-methoxyphenyl)-piperazine: rac. 3'-{3-[4-(o-methoxyphenyl) - 1-piperazinyl]-2-hydroxy-propoxy]-propionanilide dihydrochloride having a melting point of 205–206° C. (from ethanol).

The 3'-(2,3-epoxypropoxy)-propionanilide employed above can be prepared in an analogous manner as described above. After recrystallization from ethyl acetate/petroleum ether, the 3'-(2,3-epoxypropoxy)-propionanilide melts at 67–69° C.

By the reaction of 4'-(2,3-epoxypropoxy)-butyranilide and 1-(o-methoxyphenyl)-piperazine: rac. 4'-{3-[4-(o-methoxyphenyl) - 1-piperazinyl]-2-hydroxy-propoxy}-butyranilide having a melting point of 215° C. (from ethanol);

By the reaction 4'-(2,3-epoxypropoxy)-butyranilide and 1-(p-methoxyphenyl)-piperazine: rac. 4'-{3-[4-(p-methoxyphenyl) - 1-piperazinyl]-2-hydroxypropoxy}-butyranilide having a melting point of 153–154° C. (from ethanol).

The 4'-(2,3-epoxypropoxy)-butyranilide employed above can be prepared in an analogous manner as described above. After recrystallization from ethyl acetate/petroleum ether, the 4'-(2,3-epoxypropoxy)-butyranilide melts at 102–103° C.

EXAMPLE 2

Preparation of 4'-{3-[4-(o-methoxy-phenyl)-1-piperazinyl]-propoxy}-acetanilide 5.4 g. of 4'-(3-bromopropoxy)-acetanilide, 4 g. of 1-(o-methoxy-phenyl)-piperazine, 1.4 g. of potassium carbonate and a few crystals of potassium iodide are heated under reflux conditions in 30 ml. of ethanol for 24 hours. The reaction solution is filtered hot and thereafter evaporated under reduced pressure. The residual 4'-{3-[4-(o-methoxy - phenyl)-1-piperazinyl]-propoxy}-acetanilide is made congo-acidic with ethanolic hydrochloric acid to form the hydrochloride which melts at 259–261° C. (dec.) after recrystallization from methanol/ethyl acetate.

In an analogous manner there is obtained:

By the reaction of 2'-(3-bromopropoxy)acetanilide and 1-o-methoxyphenyl)-piperazine: 2'-{3-[4-(o-methoxyphenyl)-1-piperazinyl]-propoxy}-acetanilide dihydrochloride having a melting point of 118–120° C.

EXAMPLE 3

Preparation of rac.- 2' - {3 - [4 - (o-methoxyphenyl)-1-piperazinyl] - 2 - hydroxy - propoxy} - N- methylacetanilide 11 g. of 2'-(2,3-epoxypropoxy)-N-methyl-acetanilide and 9.6 g. of 1-(o-methoxyphenyl)-piperazine are heated under reflux conditions in 100 ml. of ethanol for 1 hour. The solvent is removed by evaporation under reduced pressure. The residual oily rac. - 2' - {3 - [4 - (o-methoxyphenyl) - 1 - piperazinyl] - 2 - hydroxypropoxy}-N-methylacetanilide is dissolved in ethyl acetate, converted into the hydrochloride by addition of alcoholic hydrochloric acid up to the congo-acidic reaction and precipitated with ether. For purification, the product is once more transformed into the base and again converted into the hydrochloride in the same manner. After recrystallization from ethanol/ethyl acetate, rac.-2'-{3-[4-(o-methoxyphenyl) - 1 - piperazinyl]-2-hydroxy-propoxy}-N-methylacetanilide dihydrochloride melts at about 170° C.

The oily 2'-(2,3-epoxy-propoxy)-N-methylacetanilide employed above can be prepared in an analogous manner as described in Example 1, $n_D^{23}$=1.523.

EXAMPLE 4

Preparation of rac.-4'-{3-[4-(o-methoxyphenyl)-1-piperazinyl]-2-hydroxy-propoxy}-acetanilide 1.3 g. of 4'-(3-chloro-2-hydroxy-propoxy)-acetanilide and 0.9 g. of 1-(o-methoxyphenyl)-piperazine are treated with 0.5 g. of sodium bicarbonate and a few crystals of sodium iodide and introduced into a mixture of 10 ml. of dimethylformamide and 20 ml. of tetrahyrofuran. The reaction mixture is heated under reflux conditions for 24 hours. After cooling, it is poured into water and extracted with ethyl acetate. The rac.-4'-{3-[4-(o-methoxyphenyl) - 1 - piperazinyl]-2-hydroxy-propoxy}-acetanilide remains after evaporation of the solvent is dissolved in ethyl acetate and converted to the hydrochloride by addition of alcoholic hydrochloric acid up to the congo-acidic reaction. The hydrochloride salt melts at 232–233° C. after recrystallization from methanol.

The 4'-(3-chloro-2-hydroxy-propoxy)-acetanilide employed above can be prepared in the following manner:

4.1 g. of 4'-(2,3-epoxypropoxy)-acetanilide and 4.6 g. of pyridine hydrochloride are heated under reflux conditions in 20 ml. of methanol for 1 hour. The residue which remains after evaporation of the solvent is dissolved in n-butanol, and the solution is repeatedly extracted with water. The organic phase is separated and evaporated. The residual oily 4' - (3 - chloro - 2 - hydroxy-propoxy)-acetanilide is dissolved in ethyl acetate/cyclohexane and crystallized. After recrystallization from ethyl acetate/cyclohexane, 4'-(3-chloro-2-hydroxy-propoxy)-acetanilide melts at 106–108° C.

EXAMPLE 5

Preparation of 4'-[{3-[4-(o-methoxyphenyl)-1-piperazinyl]-propyl}-thio]-acetanilide 2.9 g. of 4'-(3-bromo-propylthio)-acetanilide and 1.9 g. of 1-(o-methoxyphenyl)-piperazine are introduced to 20 ml. of ethanol and, after the addition of 0.7 g. of potassium carbonate and a few crystals of potassium iodide, the mixture is heated under reflux conditions for 24 hours. The reaction solution is filtered hot and thereafter evaporated under reduced pressure. The residual 4' - [{3 - [4 - (o-methoxyphenyl) - 1 - piperazinyl] - propyl} - thio] - acetanilide is taken up in ethyl acetate and treated with alcoholic hydrochloric acid to a congo-acidic reaction. The crystalline 4' - [{3 - [4 - (o - methoxyphenyl) - 1 - piperazinyl] - propyl} - thio] - acetanilide hydrochloride precipitates and melts at 234–236° C. after recrystallization from methanol.

The 4' - (3 - bromo - propylthio)-acetanilide employed above can be prepared as follows:

16.7 g. of 4-acetaminothiophenol, 60 ml. of ethanol, 8 g. of 50 percent aqueous caustic soda and 156 g. of 1,3-dibromopropane are heated under reflux conditions for 3 hours. The excess 1,3-dibromoporpane is removed by steam-distillation. The oil which separates out is taken up in chloroform. Thereafter, the organic phase is washed twice with 1 N caustic soda and with water to a neutral reaction. The oily 4'-(3-bromo-propylthio)-acetanilide which remains after evaporation of the solvent is chromatographed on a column of neutral aluminum oxide [activity grade 1] [eluting agent: benzene]. After recrystallization from dilute ethanol, 4'-(3-bromo-propylthio)-acetanilide melts at 85° C.

EXAMPLE 6

Preparation of rac. 4'-[{3-[4-(o-methoxyphenyl)-1-piperazinyl]-2-hydroxy-propyl}-thio]-acetanilide 2.2 g. of 4'-(2,3-epoxypropylthio)-acetanilide and 1.9 g. of 1-(o-methoxyphenyl)-piperazine are heated under reflux conditions in 20 ml. of ethanol for 1 hour. The oily rac. 4' - [{3 - [4 - (o-methoxyphenyl)-1-piperazinyl]-2-hydroxy-propyl}-thio]-acetanilide which remains after evaporation of the solvent is dissolved in ethyl acetate and converted into the hydrochloride by addition of alcoholic hydrochloric acid. After recrystallization from methanol/ethyl acetate, rac. 4'-[{3-[4-(o-methoxyphenyl)-1-piperazinyl]-2-hydroxy-propyl}-thio]-acetanilide hydrochloride melts at 211–212° C.

The 4' - (2,3 - epoxypropylthio)-acetanilide employed above can be prepared as follows:

33.4 g. of p-acetaminothiophenol are introduced to a solution of 8.8 g. of sodium hydroxide in water. The solution is treated with 27.6 g. of epichlorohydrin with stirring. The reaction proceeds exothermically and is controlled by cooling. Thereafter, the reaction mixture is stirred at room temperature for 12 hours. The beige-colored 4'-(2,3-epoxypropylthio)-acetanilide which precipitates is washed with water. After recrystallization from ethyl acetate/cyclohexane, the 4' - (2,3 - epoxypropylthio) - acetanilide melts at 82° C.

EXAMPLE 7

Preparation of rac.-4'-{3-[4-(o-methoxyphenyl)-1-piperazinyl]-2-hydroxy-propoxy}-acetanilide 0.75 g. of p-acetaminophenol are introduced to a solution of 120 mg. of sodium in 30 ml. of absolute methanol. The mixture is treated with 1.4 g. of 1-chloro-2-hydroxy-3 - [4 - (o-methoxyphenyl)-1-piperazinyl]-propane and heated under reflux conditions for 20 hours. Sodium chloride which precipitates is removed by filtration. The filtrate is evaporated to dryness. The residual rac.-4'-{3 - [4 - (o-methoxyphenyl)-1-piperazinyl]-2-hydroxypropoxy}-acetanilide is converted into the hydrochloride by addition of alcoholic hydrochloric acid up to congo-acidic reaction. The rac.-4'-{3-[4-(o-methoxyphenyl)-1-piperazinyl] - 2-hydroxy-propoxy}-acetanilide hydrochloride melts at 228–230° C. after recrystallization from methanol.

The 1 - chloro - 2 - hydroxy-3-[4-(o-methoxyphenyl)-1-piperazinyl]-propane employed above can be prepared as follows:

3.8 g. of 1 - (o-methoxyphenyl)-piperazine are dissolved in 20 ml. of methanol and treated with 2 g. of epichlorohydrin. The crystalline 1 - chloro - 2 - hydroxy-3 - [4 - (o-methoxyphenyl) - 1 - piperazinyl]-propane which separates after 72 hours at room temperature, melts at 107–107.5° C. after recrystallization from methanol.

EXAMPLE 8

Preparation of rac. - 4' - {3 - [4 - (o-aminophenyl)-1-piperazinyl] - 2 - hydroxy-propoxy}-acetanilide hydrochloride 0.73 g. of rac. - 4' - [3 - (1 - piperazinyl) - 2 - hydroxy-propoxy]-acetanilide hydrochloride, 0.34 g. of potassium hydroxide and 0.32 g. of o-chloronitrobenzene in 20 ml. of n-butanol are reacted under reflux conditions for 12 hours. The resulting reaction mixture is evaporated under reduced pressure, and the residue is taken up in chloroform. The solution is washed with water and evaporated to dryness. The residual rac.-4'-{3-[4-(o-nitrophenyl)-1 - piperazinyl] - 2 - hydroxy-propoxy}-acetanilide is purified by adsorption on silica gel [elution mixture: methanol]. The hydrochloride salt melts at 243° C.

0.45 g. of the foregoing compound is dissolved in 200 ml. of ethanol (95 percent) with mild heating and hydrogenated in the presence of 50 mg. of platinum oxide at room temperature. The hydrogenation is carried out until the theoretical uptake of hydrogen is completed. The catalyst is removed by filtration. The filtrate is brought to a congo-acidic reaction with ethanolic hydrochloric acid and evaporated to dryness under reduced pressure. The residual rac.-4'-{3-[4-(o-aminophenyl) - 1 - piperazinyl] - 2 - hydroxy-propoxy}-acetanilide hydrochloride, after recrystallization from ethanol/ethyl acetate, has a melting point of 232–234° C.

EXAMPLE 9

Preparation of o-{3-[4-(o-methoxyphenyl)-1-piperazinyl]-propoxy}-aniline dihydrochloride 1.0 g. of o-{3-[bis-(2-chloroethyl)-amino]-propoxy}-nitrobenzene and 0.3 g. of o-anisidine in 20 ml. of n-butanol are heated under reflux conditions for 8 hours. The reaction mixture is then treated with 150 mg. of potassium carbonate. Thereafter, the reaction mixture is heated under reflux conditions for another 24 hours and subsequently extracted with water. The aqueous extract is washed with ethyl acetate, made alkaline and extracted with chloroform. The chloroform extract is evaporated to dryness. The residual o-{3-[4-(o-methoxyphenyl) - 1 - piperazinyl]-propoxy}-nitrobenzene is converted to the hydrochloride salt by known procedure. After recrystallization from methanol/ether, the hydrochloride has a melting point of 195–196° C.

0.8 g. of the foregoing compound are dissolved in 100 ml. of ethanol (95 percent) and hydrogenated in the presence of 50 mg. of platinum oxide at room temperature. The hydrogenation is continued until the theoretical uptake of hydrogen is completed. The catalyst is removed by filtration. The filtrate is made congo-acidic with ethanolic hydrochloric acid and evaporated to dryness under reduced pressure. The residual o-{3-[4-(o-methoxyphenyl) - 1 - piperazinyl]-propoxy}-aniline dihydrochloride, after recrystallization from methanol/ethyl acetate melts at 250° C.

The o-{3 - [bis-(2 - chloroethyl)-amino]-propoxy]-nitrobenzene employed above can be prepared as follows:

28 g. of o-(3-bromopropoxy)-nitrobenzene, 10.1 g. of diethanolamine, 25 g. of potassium carbonate, a crystal of potassium iodide, 250 ml. of isopropanol and 30 ml. of water are heated under reflux conditions for 24 hours. The reaction mixture is evaporated under reduced pressure. The residue is dissolved in 50 ml. of chloroform and 50 ml. of water. The chloroform phase is separated, dried over potassium carbonate and evaporated. The residual o-{3 - [bis-(2-hydroxyethyl)-amino]-propoxy}-nitrobenzene is converted to the hydrochloride salt by the addition of alcoholic hydrochloric acid. The hydrochloride, after recrystallization from ethanol/ethyl acetate, melts at 90–91° C.

1.6 g. of the foregoing compound is suspended in 20 ml. of methylene chloride and treated with 1.4 g. of thionyl chloride. The reaction mixture is heated for 30 minutes under reflux conditions. The resulting clear solution is evaporated to dryness under reduced pressure. The residual o-{3-[bis-(2-chloroethyl)-amino]-propoxy}-nitrobenzene, after recrystallization from methanol/ether, melts at 133–135° C.

EXAMPLE 10

Preparation of rac.-4'-{3-[4-(p-methoxyphenyl)-1-piperazinyl]-2-hydroxy-propoxy}-butyranilide 1.7 g. of rac.-4' - (3 - amino-2-hydroxy-propoxy)-butyranilide, 1.25 g. of bis-N,N - (2 - bromoethyl)-o-anisidine, 0.56 g. of potassium hydroxide in 50 ml. of n-butanol and 3 drops of water are heated over a 20-hour period under reflux conditions. Then, the reaction mixture is evaporated under reduced pressure. The residue is dissolved in chloroform. The chloroform extract is washed with water and evaporated. The residual rac.-4'-{3-[4-(p-methoxyphenyl)-1-piperazinyl]-2 - hydroxy-propoxy}-butyranilide is purified by adsorption on silica gel [elution solvent:methanol] and has a boiling point of 152° C.

The rac. 4'-(3-amino-2-hydroxy-propoxy)butyranilide employed above can be prepared as follows:

12.0 g. of 4' - (2,3 - epoxypropoxy) - butyranilide are treated with stirring over a 1-hour period with 250 ml. of a solution containing ammonia and methanol (about 10 percent). The reaction mixture is allowed to stand at room temperature for 24 hours and after the addition of 10 ml. more of an aqueous ammonia solution, is allowed to stand in the cold for 12 hours. Subsequently, the reaction mixture is filtered, and the filtrate is evaporated under reduced pressure. The residual rac. 4'-(3-amino-2-hydroxy-propoxy)-butyranilide, after recrystallization from ethyl acetate, has a melting point of 138–140° C.

EXAMPLE 11

Preparation of rac. 4'-{3-[4-(o-methoxyphenyl)-1-piperazinyl]-2-hydroxy-propoxy}-butyranilide 0.2 g. of rac. 4'-{3-[2-(o-anisidino-ethyl)-amino]-2-hydroxy-propoxy}-butyranilide and 0.1 g. of 1,2-dibromoethane are heated on a water bath for 12 hours. After cooling, the reaction mixture is extracted with ether. The ethereal extract is filtered and evaporated under reduced pressure, and the residue is dissolved in sodium hydroxide and chloroform. The chloroform phase is evaporated. The residual rac. 4'-{3-[4-(o-methoxyphenyl)-1-piperazinyl]-2-hydroxy-propoxy}-butyranilide is purified by adsorption on silica gel [elution solvent: ethyl acetate]. The resulting base can be converted to the dihydrochloride in the usual manner and has a melting point of 215° C. (from ethanol).

The rac. 4'-{3-[2-(o - anisidino - ethyl) - amino] - 2-hydroxy-propoxy} - butyranilide employed above can be prepared as follows:

12.0 g. of 4'-(2,3-epoxy-propoxy)-butyranilide are treated with 50 ml. of methanol, 50 ml. of ethylenediamine and a trace of potassium hydroxide. The reaction mixture is allowed to stand at room temperature for 12 hours. The excess ethylenediamine and the solvent are evaporated under reduced pressure. The residual rac. 4'-[3-(1-aziridinyl)-2-hydroxy-propoxy] - butyranilide, after two recrystallizations from ethyl acetate, has a melting point of 108–110° C.

5.6 g. of rac. 4'-[3-(1-aziridinyl)-2-hydroxy-propoxy]-butyranilide and 2.5 g. of o-anisidine are dissolved in 25 ml. of methanol and treated with a solution containing 5.6 ml. of maleic acid in 10 ml. of methanol. The reaction mixture is allowed to stand at room temperature for 72 hours. Thereafter, the reaction mixture is evaporated under reduced pressure. The base is liberated by the addition of an excess of 1 N sodium hydroxide solution and is extracted with chloroform. The chloroform extract is evaporated. The residual rac. 4'-{3-[2-(o-anisidino-ethyl)-amino] - 2 - hydroxy - propoxy}-butyranilide is purified by adsorption on silica gel [elution solvent: methanol]. After recrystallization from ethyl acetate, the product melts at 103–104° C.

EXAMPLE 12

Preparation of rac. 2'-[3-(4-phenyl-1-piperazinyl)-2-hydroxy-propoxy]-aniline dihydrochloride 4.06 g. of rac. 2'-[3-(4-phenyl-1-piperazinyl) - 2 - hydroxy-propoxy]-acetanilide hydrochloride are treated with 20 ml. of hydrochloric acid (about 20 percent) and heated under reflux conditions for 2 hours. The resulting solution is evaporated to dryness under reduced pressure. The residual rac. 2'-[3-(4-phenyl-1-piperazinyl) - 2 - hydroxy-propoxy]-aniline dihydrochloride melts at 290° C. after recrystallization from ethanol/ether.

In an analogous manner, there is obtained:

By the reaction of rac. 2'-{3-[4-(o-methoxyphenyl) - 1-piperazinyl] - 2 - hydroxy - propoxy} - acetanilide hydrochloride: race. 2'-{3-[4-(o-methoxyphenyl)-1-piperazinyl] - 2 - hydroxy-propoxy}-aniline trihydrochloride having a melting point of 260–262° C. (from methanol/ethyl acetate/ether);

By the reaction of rac. 2'-{2-hydroxy-3-[4-(o-methoxyphenyl) - 1 - piperazinyl] - propoxy} - N - methyl-acetanilide: race. 2' - {3 - [4-(o-methoxyphenyl) - 1-piperazinyl] - 2 - hydroxy - propoxy} - methylaniline having a melting point of 198° C. (from methanol).

EXAMPLE 13

Preparation of rac. 2'-{3-[4-(o-methoxyphenyl)-1-piperazinyl]-2-hydroxy-propoxy}-methanesulfonanilide To a solution containing 4.1 g. of rac. o-{3-[4-(o-methoxyphenyl) - 1 - piperazinyl] - 2 - hydroxy-propoxy}-aniline in 10 ml. of absolute benzene and 5 ml. of absolute pyridine is added a solution containing 1.5 g. of methanesulfonic acid chloride in 5 ml. of benzene with ice cooling and stirring. The mixture is allowed to stand at room temperature for 12 hours. The reaction mixture which solidifies to a solid mass is treated with water after the addition of 20 ml. of chloroform. The organic phase is separated and evaporated. The residual oily rac. 2'-{3-[4-(o-methoxyphenyl)-1-piperazinyl] - 2 - hydroxy-propoxy}-methanesulfonanilide is converted to the crystalline hydrochloride by the addition of ethanolic hydrochloric acid and ethyl acetate. After recrystallization from alcohol/ethyl acetate/ether, the product has a melting point of 217–218° C.

In an analogous manner there is obtained:

By the reaction of o-{3-[4-(o-methoxyphenyl)-1-piperazinyl] - propoxy} - aniline: 2'-{3-[4-(o-methoxyphenyl)-1-piperazinyl] - propoxy} - methanesulfonanilide dihydrochloride having a melting point of 200–201° C. from ethanol/ethyl acetate).

EXAMPLE 14

Preparation of rac. 2'-{3-[4-(o-acetamido-phenyl)-1-piperazinyl]-2-hydroxy-propoxy}-acetanilide 2.4 g. of rac. o-{2-[4-(o-aminophenyl)-1-piperazinyl]-2-hydroxy-propoxy}-aniline are dissolved in 20 ml. of acetic acid and treated wtih 1 g. of acetic anhydride. The reaction mixture is allowed to stand at room temperature for 12 hours. The solvent is removed under reduced pressure. The residue is dissolved in ethyl acetate, and the resulting solution is treated with ethanolic hydrochloric acid. The precipitated rac. 2'-{3-[4-(o-acetamido-phenyl) - 1 - piperazinyl] - 2 - hydroxy-propoxy}-acetanilide, after recrystallization from ethyl acetate, has a melting point of 78–80° C.

The rac. o-{3-[4-(o-aminophenyl) - 1 - piperazinyl]-2-hydroxy-propoxy}-aniline employed above can be prepared as follows:

2 g. of 2-(2,3-epoxy-propoxy)-nitrobenzene and 2.1 g. of 1-(o-nitrophenyl)-piperazine in 20 ml. of ethanol (95 percent) are heated under reflux conditions for 1.5 hours. The solvent is evaporated under reduced pressure. The residue is dissolved in ethyl acetate and acidified to a congo-acidic reaction with alcoholic hydrochloric acid. The rac. o-{3-[4-(o-nitrophenyl) - 1 - piperazinyl]-2-hydroxy-propoxy}-nitrobenzene hydrochloride, after recrystallization from ethanol/isopropanol, has a melting point of 203–205° C.

1 g. of rac. o-{3-[4-(o-nitrophenyl)-1-piperazinyl]-2-hydroxy-propoxy}-nitrobenzene is dissolved in 50 ml. of ethanol (95 percent) and hydrogenated with 50 mg. of platinum oxide at room temperature under normal pressure. The hydrogenation is stopped upon the theoretical uptake of hydrogen. The catalyst is removed by filtration. The filtrate is weakly acidified with alcoholic hydrochloric acid and evaporated to dryness under reduced pressure. The residual rac. o-{3-[4-(o-aminophenyl)-1-piperazinyl]-2-hydroxy-propoxy}-aniline trihydrochloride, after recrystallization from ethanol/ethyl acetate, has a melting point over 300° C.

In an analogous manner there is obtained:

By the reaction of rac. o-{3-[4-(o-methoxyphenyl)-1-piperazinyl]-2-hydroxy-propoxy}-aniline: rac. 2'-{3-[4-o-methoxyphenyl) - 1 - piperazinyl] - 2 - hydroxy-propoxy}-acetanilide hydrochloride having a melting point of 180–182° C. (from ethanol/ethyl acetate);

By the reaction of o-{3-[4-(o-methoxyphenyl)-1-piperazinyl]-propoxy}-aniline: 2'-{3-[4-(o-methoxyphenyl)-1 - piperazinyl] - propoxy}-acetanilide dihydrochloride having a melting point of 218–222° C. (from ethanol/ethyl acetate).

EXAMPLE 15

Preparation of rac. 2'-{3-[4-(o-methoxyphenyl)-1-piperazinyl]-2-acetoxy-propoxy}-acetanilide 4.35 g. of rac. 2'-{3-[4-(o-methoxyphenyl)-1-piperazinyl]-2-hydroxy-propoxy}-acetanilide are suspended in 20 ml. of pyridine and, after the addition of 2 g. of acetic anhydride, are heated under reflux conditions for 10 minutes. The reaction mixture, after being stored at room temperature for 12 hours, is poured into water. The base is exhaustively extracted with chloroform. The chloroform extract is washed with water and evaporated under reduced pressure. The residual rac. 2'-{3-[4-(o-methoxyphenyl)-1-piperazinyl] - 2 - acetoxy-propoxy}-acetanilide in the form of the hydrochloride, has a melting point of 201–202° C.

In an analogous manner there is obtained:

By the reaction of rac. 4'-{3-[4-(o-methoxyphenyl)-1-piperazinyl]-2-hydroxy-propoxy}-acetanilide: rac. 4'-{3-[4-(o-methoxyphenyl) - 1 - piperazinyl] - 2 - acetoxy-propoxy}-acetanilide hydrochloride having a boiling point of 175° C.

EXAMPLE 16

Preparation of rac. 2'-{3-[4-(o-methoxyphenyl)-1-piperazinyl]-2-acetoxy-propoxy}-acetanilide 0.5 g. of rac. o-{3-[4-(o-methoxyphenyl)-1-piperazinyl]-2-hydroxy-propoxy}-aniline is dissolved in 5 ml. of glacial acetic acid, treated with 0.5 g. of acetic anhydride and allowed to stand at room temperature for 24 hours. The reaction mixture thereafter is poured in water and made slightly alkaline through the addition of 1 N sodium hydroxide solution (pH about 9). The base is exhaustively extracted with chloroform. The chloroform extract is washed with water and evaporated under reduced pressure. The residual rac. 2'-{3-[4-(o-methoxyphenyl)-1-piperazinyl]-2-acetoxy-propoxy}-acetanilide is converted to the hydrochloride by known procedures and has a melting point of 201–202° C. (from methanol/ether).

EXAMPLE 17

Preparation of (+) o-{3-[4-(o-methoxyphenyl)-1-piperazinyl] - 2 - hydroxy-propoxy}-nitrobenzene dibenzoyl tartrate 38.8 g. of rac. o-{3-[4-(o-methoxyphenyl)-1-piperazinyl]-2-hydroxy-propoxy}-nitrobenzene and 36.0 g. of (+) O,O-dibenzoyl tartaric acid are dissolved in 3,500 ml. of hot methanol. The solution is allowed slowly to cool to room temperature. The (+) o-{3-[4-(o-methoxyphenyl)-1-piperazinyl] - 2 - hydroxy-propoxy}-nitrobenzene dibenzoyl tartrate separates out in the crystalline form. The salt of the (−) antipode remains in solution and can be recovered out of this. The salt of the (+) antipode, after recrystallization from 3,200 ml. of methanol, melts at 169° C.; $[\alpha]_D^{20} = +36.6°$ C. (in dimethylsulfoxide, c.=1).

The resulting salt of the (+) antipode is added to 200 ml. of 1 N sodium hydroxide solution and 500 ml. of chloroform. The mixture is agitated. The formed free base, after recrystallization from ethyl acetate/petroleum ether, has a melting point of 75–77° C.; $[\alpha]_{436}^{20} = +14.4°$ C. [in ethanol, c.=1].

3.0 g. of (+) o-{3-[4-(o-methoxyphenyl)-1-piperazinyl]-2-hydroxy-propoxy}-nitrobenzene are dissolved in 100 ml. of ethanol and hydrogenated in the presence of platinum oxide. The hydrogenation is continued until the theoretical uptake of hydrogen is completed. The catalyst is removed by filtration. The solvent is evaporated under reduced pressure. The residual (+) o-{3-[4-(o-methoxyphenyl) - 1 - piperazinyl] - 2 - hydroxy-propoxy}-aniline [the trihydrochloride of which melts at 263°; $[\alpha]_{436}^{20} = +31.8°$ C. (in water, c.=1)] is dissolved in 20 ml. of 3 N acetic acid and treated with 1 g. of acetic anhydride. The reaction mixture is allowed to stand at room temperature for 12 hours and thereafter is evaporated under reduced pressure. The residue is dissolved in ethyl acetate and treated with ethanolic hydrochloric acid. The precipitated (+) 2'-{-[4-(o-methoxy-phenyl)-1-piperazinyl]-2 - hydroxy-propoxy}-acetanilide, after recrystallization from ethyl acetate, has a melting point of 179° C.; $[\alpha]_{436}^{20} = +41.4$ C. (in water, c.=1).

The (−) antipode can be obtained in a similar manner by the treatment of rac. o-{3-[4-(o-methoxyphenyl)-1-piperazinyl]-2-hydroxy-propoxy}-nitrobenzene with (−) O,O-dibenzoyltartaric acid.

EXAMPLE 18

Tablets are prepared of the following composition:

| | Mg. |
|---|---|
| (+) 2' - [3 - [4-o-methoxy-phenyl)-1-piperazinyl]-2 - hydroxy-propoxy - acetanilide hydrochloride | 10 |
| Lactose | 63 |
| Corn starch | 74 |
| Talcum | 2.7 |
| Magnesium stearate | 0.3 |
| | 150.0 |

The (+) 2' - {3-[4-o-methoxy-phenyl)-1-piperazinyl]-2-hydroxy-propoxy}-acetanilide hydrochloride is mixed with the lactose and the corn starch and granulated with the aid of ethanol. The granulate is dried, mixed with talcum and pressed to tablets.

| | Mg. |
|---|---|
| Individual weight of one tablet | 150 |
| Active substance weight of one tablet | 10 |

We claim:

1. A compound of the formula

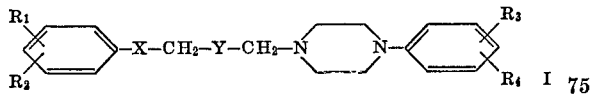

wherein $R_1$ is amino, lower alkanoylamido of 1–6 carbon atoms, primary or secondary lower alkylsulfonylamido of 1–6 carbon atoms;

$R_2$ is hydrogen;

$R_3$ and $R_4$, individually, are hydrogen, halogen, primary or secondary lower alkyl of 1–6 carbon atoms or primary or secondary lower alkoxy of 1–6 carbon atoms;

X is oxy or thio; and

Y is hydroxymethylene, or lower alkanoyloxymethylene wherein the alkanoyl is of 1–6 carbon atoms its antipodes or pharmaceutically acceptable acid addition salts thereof.

2. A compound in accordance with claim 1, wherein X is thio.

3. A compound in accordance with claim 1, wherein X is oxy.

4. A compound in accordance with claim 3, wherein Y is hydroxymethylene.

5. A compound in accordance with claim 4, wherein $R_2$ and $R_3$ are hydrogen.

6. A compound in accordance with claim 5, wherein $R_1$ is lower alkanoylamido of 1–6 carbon atoms and $R_4$ is primary or secondary lower alkoxy of 1–6 carbon atoms.

7. A compound in accordance with claim 6, wherein $R_1$ is o-acetamido and $R_4$ is o-methoxy, i.e., rac. 2'-{3-[4-o-methoxy-phenyl) - 1 - piperazinyl] - 2 - hydroxy-propoxy}-acetanilide.

8. A compound in accordance with claim 7, (+) 2'-{3 - [4 - (o - methoxy-phenyl)-1-piperazinyl]-2-hydroxy-propoxy}-acetanilide.

9. A compound in accordance with claim 5, wherein $R_1$ is lower alkanoylamido of 1–6 carbon atoms and $R_4$ is hydrogen.

10. A compound in accordance with claim 9, wherein $R_1$ is o-acetamido, i.e., rac. 2'-[3-(4-phenyl-1-piperazinyl)-2-hydroxy-propoxy]-acetanilide.

11. A compound of the formula

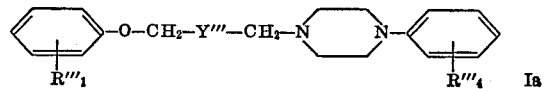

wherein $R'''_1$ and $R'''_4$ are nitro, or $R'''_1$ is nitro, and $R'''_4$ is primary or secondary lower alkoxy of 1–6 carbon atoms, or $R'''_4$ is nitro and $R'''_1$ is lower alkanoylamido of 1–6 carbon atoms; and $Y'''$ is hydroxymethylene, its antipodes or pharmaceutically acceptable acid addition salts thereof.

12. A compound in accordance with claim 11, wherein $R'''_1$ is o- nitro; $Y'''$ is hydroxymethylene and $R'''_4$ is o-methoxy, i.e., rac. o-{3-[4-(o-methoxy-phenyl)-1-piperazinyl]-2-hydroxypropoxy}-nitrobenzene.

13. A compound in accordance with claim 12, (+) o-{3 - [4 - (o - methoxy-phenyl)-1-piperazinyl]-2-hydroxy-propoxy}-nitrobenzene.

14. A compound in accordance with claim 1, rac.-2'-{3 - [4 - (o - methoxypehnyl)-1-piperazinyl]-2-hydroxy-propoxy}-methane-sulfonanilide.

15. A compound in accordance with claim 1, rac.-4'-{3 - [4 - (o - methoxyphenyl)-1-piperazinyl]-2-hydroxy-propoxy}-acetanilide.

16. A compound in accordance with claim 5, wherein $R_1$ is amino and $R_4$ is primary or secondary lower alkoxy of 1–6 carbon atoms.

(References on following page)

References Cited

UNITED STATES PATENTS

| | | | |
|---|---|---|---|
| 2,995,553 | 8/1961 | Sommers | 260—268 |
| 3,089,819 | 5/1963 | Short | 260—268 X |
| 3,168,522 | 2/1965 | De Stevens et al. | 260—268 |
| 3,211,735 | 10/1965 | De Stevens et al. | 260—268 |
| 3,270,004 | 8/1966 | Alter | 260—268 X |
| 3,277,094 | 10/1966 | Werner | 260—268 |
| 3,534,084 | 10/1970 | Marayan | 260—268 BC |
| 3,577,422 | 5/1971 | Wideburg | 260—268 PH |
| 3,580,914 | 5/1971 | Pedrazzoli | 260—268 R |

FOREIGN PATENTS

| | | | |
|---|---|---|---|
| 1,349,636 | 12/1963 | France | 260—268 |
| 40/17,030 | 8/1965 | Japan | 260—268 |

DONALD G. DAUS, Primary Examiner

U.S. Cl. X.R.

260—239 E, 268 R, 268 DR, 348 R, 457, 458, 482 R, 576, 562 R, 562 A, 609 R, 612 D, 622 R; 424—250

PO-1050
(5/69)

UNITED STATES PATENT OFFICE
CERTIFICATE OF CORRECTION

Patent No. 3,701,777                    Dated  October 31, 1972

Inventor(s)  Albrecht Edenhofer and Hans Spiegelberg

It is certified that error appears in the above-identified patent and that said Letters Patent are hereby corrected as shown below:

Column 18, claim 7, line 29, "-[4-o-" should be:

-[4-(o-

Column 18, claim 14, line 66, "(o-methoxypehnyl)" should be:

(o-methoxyphenyl)

Signed and sealed this 29th day of May 1973.

(SEAL)
Attest:

EDWARD M. FLETCHER, JR.           ROBERT GOTTSCHALK
Attesting Officer                 Commissioner of Patents